United States Patent [19]
Wadsworth

[11] Patent Number: 5,133,637
[45] Date of Patent: Jul. 28, 1992

[54] VERTICAL AXIS WIND TURBINE GENERATOR

[76] Inventor: William H. Wadsworth, 3929 Sterling N.W., Norman, Okla. 73072

[21] Appl. No.: 673,374

[22] Filed: Mar. 22, 1991

[51] Int. Cl.[5] ......................... F03D 3/06; F03D 11/00
[52] U.S. Cl. ........................................ 415/4.4; 415/4.1
[58] Field of Search .................. 415/2.1, 3.1, 4.2, 4.4; 416/84

[56] References Cited

U.S. PATENT DOCUMENTS

| | | |
|---|---|---|
| 204,481 | 6/1878 | Cleland . |
| 381,679 | 4/1888 | Devereux . |
| 574,290 | 12/1896 | Twiss . |
| 695,524 | 3/1902 | Woodell . |
| 772,786 | 10/1904 | Clifford . |
| 1,003,661 | 9/1911 | Shaffer . |
| 1,315,595 | 9/1919 | Clark . |
| 1,545,633 | 7/1925 | Bender . |
| 1,640,269 | 8/1927 | Ellison .................. 415/4.2 |
| 1,652,022 | 12/1927 | Lemke .................. 415/2.1 |
| 1,810,113 | 6/1931 | Schlotzhauer ........... 415/2.1 |
| 4,070,131 | 1/1978 | Yen ..................... 415/4.4 |
| 4,084,918 | 4/1978 | Pavlecka ............... 415/2.1 |
| 4,134,707 | 1/1979 | Ewers .................. 415/4.2 |
| 4,168,439 | 9/1979 | Palma . |
| 5,038,049 | 8/1991 | Kato ................... 415/2.1 |

FOREIGN PATENT DOCUMENTS 3004910  8/1981  Fed. Rep. of Germany ........ 416/84

*Primary Examiner*—Edward K. Look
*Assistant Examiner*—Michael S. Lee
*Attorney, Agent, or Firm*—James T. Robinson

[57] ABSTRACT

A vertical axis wind turbine provides a rotor assembly which rotates on bearing assemblies affixed to a rotor shaft supported by a base, the rotor assembly having inclined vanes mounted between top and bottom plates to impart lift to the rotor assembly and reduce friction on the bearing assemblies, and power takeoff means to provide power by direct mechanical linkage or to drive an electrical generator.

5 Claims, 2 Drawing Sheets

VERTICAL AXIS WIND TURBINE GENERATOR

BACKGROUND OF THE INVENTION

1. Field of the Invention

This invention relates to a wind turbine of the vertical axis type and more particularly, but not by way of limitation, to a vertical axis wind turbine whose vanes are inclined from the vertical position to provide lift and reduce the load on the turbine's supporting structure.

2. Description of the Prior Art

Until the 15th century, wind power and water power were the only energy sources available. Wind power is abundant in supply and non-polluting, yet it has not been fully utilized. Early commerce used wind power, and Columbus traveled to the New World by wind power. The industrial revolution brought with it dependence on steam and gasoline engines utilizing minerals whose supplies and dwindling and whose use carries with it air and water pollution.

Wind energy is a constantly renewable energy source. Windmills have pumped water for domestic use in outlying areas for hundreds of years. Yet devices heretofore proposed have not proven wholly satisfactory. This may be due in part to mechanical problems associated with windmills, unreliability of wind currents in many regions, and rural electrification efforts of the 1930's.

A variety of wind turbines are known in the art. A Savonius rotor has been designed to reduce drag on its upwind-traveling vane, but it has not completely eliminated the drag effect. An S-type Savonius wind machine remains subject to the Magnus effect, which causes a force on the rotor perpendicular to the wind so that the rotor tends to self-destruct.

A Darrieus rotor, in its several forms, is a vertical axis rotor employing airfoil blades formed in a catenary shape. Unlike the self-starting Savonius rotor, the Darrieus rotor requires an electric motor or a Savonius rotor for starting.

A Giromill, employing symmetrical blades of constant chord, provide blades which are flipped from a positive to a negative orientation at diametrically opposite points. The Giromill wind turbine requires strong winds to start, is difficult to operate at constant RPM and is less efficient than the Darrieus rotor. Large scale installations pose additional difficulties.

A vortex turbine involves a complex structure and considerable amounts of material and labor. Its enormous impact surface is uneconomical to construct and is vulnerable to wind gusts.

A propeller is a horizontal-axis device having good aerodynamic efficiency and high tip speeds, but the propeller requires a tall tower and orientation into the wind.

Power generation from the wind needs new ideas and improvements. As the world's fossil fuel energy sources are depicted, wind can once again play an important role. Improved electrolysis technology permits storage of electrical energy as hydrogen and oxygen, which are then introduced into a fuel cell to produce electrical energy as required.

The simple and uncomplicated structure of the present invention provides a self-starting vertical axis wind turbine which utilizes inclined vanes in a rotor assembly to produce lift on the rotor assembly and reduce friction between the rotor assembly and the rotor assembly's support.

SUMMARY OF THE INVENTION

According to the present invention a vertical axis wind turbine is provided which is used to generate electricity or to provide direct power to a mechanical device by means of a power takeoff. A rotor assembly having a top plate, a bottom plate, and inclined vanes is rotatably mounted on a vertical shaft. Wind contacting inclined vanes produces thrust on the inclined vanes and a lifting force on the rotor assembly. Thrust on the inclined vanes causes the rotor assembly to rotate, and the lifting force reduces the load on supporting structures. The rotation of the rotor assembly is transmitted is transmitted to an electrical generator. Curved vanes increase the thrust produced by the wind.

An object of the present invention is to provide a self-starting vertical axis wind turbine which is economical in construction and which has improved mechanical reliability resulting from a reduced load on supporting structures.

Another object of the present invention is to provide a wind turbine which operates as a large gyroscope to hold itself in a vertical position and thus is less vulnerable to extreme changes of wind direction and velocity.

Yet another object of the present invention is to provide a wind turbine which does not require a wind vane or other device to realign the turbine with each change in wind direction.

Yet another object of the present invention is to provide a vertical axis wind turbine whose construction adds strength to the rotor assembly.

Other objects, features and advantages of the present invention will become apparent from the following detailed description when read in conjunction with the drawings and appended claims.

DETAILED DESCRIPTION

Figure 1:
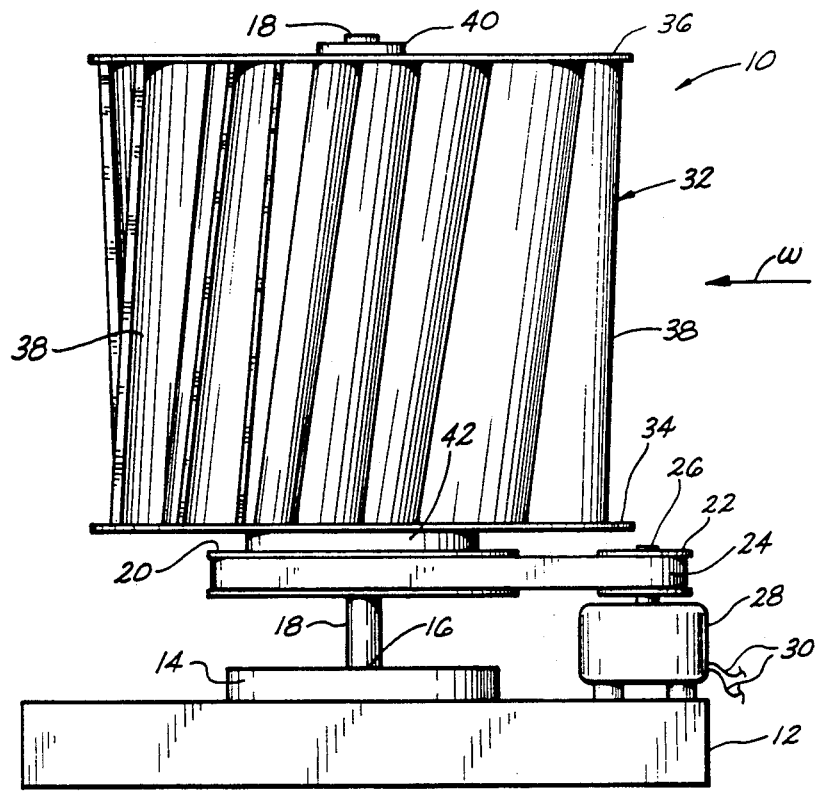
FIG. 1 is a side elevational view of my vertical axis wind turbine generator.

Referring now to the drawings, and more particularly to FIG. 1, a vertical axis wind turbine device 10 of the present invention is shown. A base 12 contains a shaft support 14 disposed therein. A lower shaft end 16 of a rotor shaft 18 is supported by the shaft support 14. A drive pulley 20 rotatably mounted on the rotor shaft 18 transmits power to a driven pulley 22 by means of an endless belt 24. The driven pulley 22 is attached to an input shaft 26 of an electrical generator 28 having leads 30. It will be clear to a person skilled in the art that the drive pulley 20, the driven pulley 22 and the endless belt 25 together form a power takeoff means. It will also be clear that alternate arrangements, including direct-drive gears and gearbox arrangements, fall within the scope and spirit of the present invention.

A rotor assembly 32 includes a bottom plate 34, a top plate 36. and inclined vanes 38 disposed between the bottom and top plates 35, 36. The rotor assembly 32 rotates on the rotor shaft 18 under the effects of the wind. The drive pulley 22 is attached to the rotor assembly 32 so that the rotor assembly 32 and the drive pulley 22 rotate as a single unit. An arrow W indicates the direction of the wind with respect to the rotor assembly 32. The rotor assembly 32 is supported on the rotor shaft 18 by an upper bearing assembly 40 and a lower bearing assembly 42. Bearing assemblies permitting a rotor assembly to rotate an a shaft are generally known to one skilled in the art and, therefore, will not be discussed further.

Figure 2:
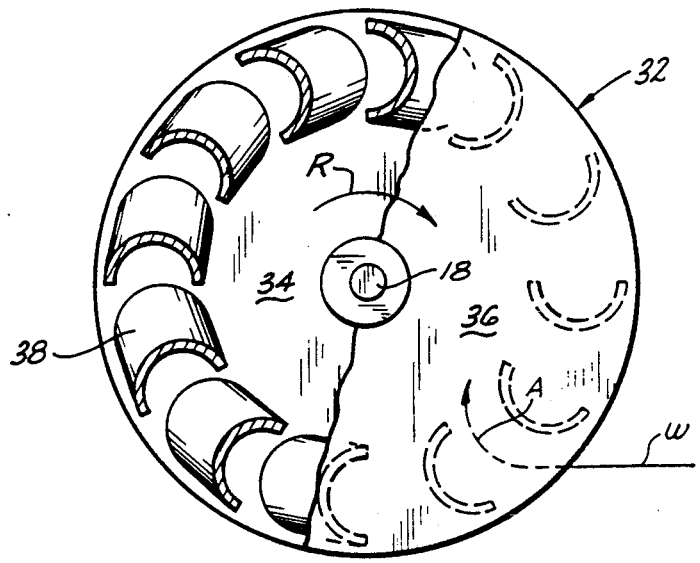
FIG. 2 is a partial cutaway top view of the device as it appears in FIG. 1.

Referring not to FIG. 2, a partial cutaway top view of the rotor assembly 32 is illustrated. The inclined vanes 38 disposed about the circumference of the plates 34, 36 undergo thrust when contacted by the wind. An arrow R indicates the direction of rotation of the rotor assembly 32. Movement of air currents between the inclined vanes 38 produces a pressure gradient from a higher pressure zone outside the rotor assembly 32 to a lower pressure zone within the rotor assembly 32, as illustrated by an arrow A.

Figure 3:
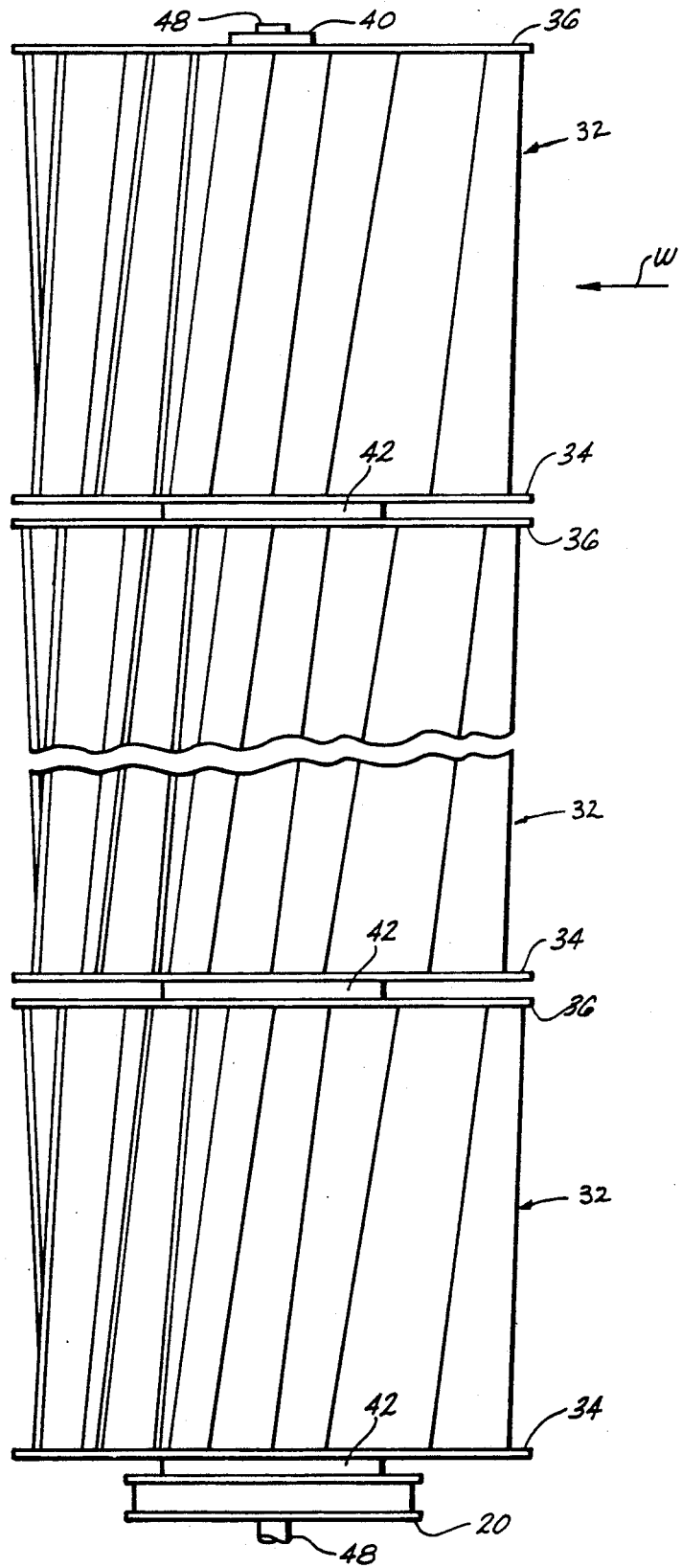
FIG. 3 is a side elevational view of multiple rotor assemblies stacked vertically.

Referring not to FIG. 3, multiple rotor assemblies 32 are shown mounted on a common shaft 48 to provide additional conversion of wind power to useful energy.

In operation, wind impinges on the inclined vanes 38 of the rotor assembly 32 to produce rotation in direction of the arrow R (FIGS. 1 and 2). Action of the wind also provides lift, thereby reducing the load on the bearing assemblies 40, 42 and on the base 12.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A vertical axis wind turbine, comprising:
    a base having a shaft support disposed therein;
    a rotor shaft having an upper shaft end and a lower shaft end, said lower shaft end supported by said shaft support;
    a rotor assembly rotatably mounted on said rotor shaft, said rotor assembly further comprising:
    a top plate;
    a bottom plate;
    a plurality of inclined vanes disposed within said top plate and said bottom plate and affixed thereto, to cause lift on said rotor assembly and thus reduce friction on said shaft support; and
power takeoff means.

2. The device of claim 1, wherein said power takeoff means further comprises:
    a drive pulley rigidly attached to said rotor assembly;
    a driven pulley mounted on an input shaft of an electrical generator; and
    an endless belt connecting said drive pulley to said driven pulley.

3. The device of claim 7, wherein said inclined vanes are curved.

4. The device of claim 1, wherein said power takeoff means further comprises:
    a drive gear rigidly attached to said rotor assembly; and
    a driven gear mounted on an input shaft of an electrical generator.

5. The device of claim 4, wherein said inclined vanes are curved.

* * * * *